(12) United States Patent
Masuda

(10) Patent No.: US 7,054,086 B2
(45) Date of Patent: May 30, 2006

(54) LIBRARY DEVICE

(75) Inventor: Takashi Masuda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/038,021

(22) Filed: Jan. 21, 2005

(65) Prior Publication Data
US 2005/0162772 A1    Jul. 28, 2005

(30) Foreign Application Priority Data
Jan. 22, 2004 (JP) ............................. 2004-014662

(51) Int. Cl.
*G11B 5/02* (2006.01)
(52) U.S. Cl. ...................................... 360/55
(58) Field of Classification Search .................. None
See application file for complete search history.

(56) References Cited

U.S. PATENT DOCUMENTS 6,710,962 B1 * 3/2004 Caverly et al. ............... 360/69

FOREIGN PATENT DOCUMENTS

JP        2002-175655 A      6/2002

* cited by examiner

*Primary Examiner*—David Hudspeth
*Assistant Examiner*—Mitchell Slavitt
(74) *Attorney, Agent, or Firm*—Foley & Lardner LLP

(57) ABSTRACT

A miniaturized library device is provided. The library device employs small-sized magazine having no flag used to detect positions of cells and the magazine is set so that a plurality of cells are arranged in one direction. An accessor mechanism having a picker mechanism to extract a cartridge from an arbitrary cell in the magazine is so mounted as to be movable along a guide rail and is positioned to a position of each of flags, which are arranged to correspond to positions of the cells in the magazine, and of a sensor flag section in a pendulum mechanism. The flags and a sensor flag section each are detected by a common X position sensor fixed to a base. Detection of presence or absence of the magazine is performed by detecting a position of the sensor flag section being displaced due to direct contact of a directly-contacted portion to the magazine.

16 Claims, 16 Drawing Sheets

*FIG.16B (PRIOR ART)*     *FIG.16A (PRIOR ART)*
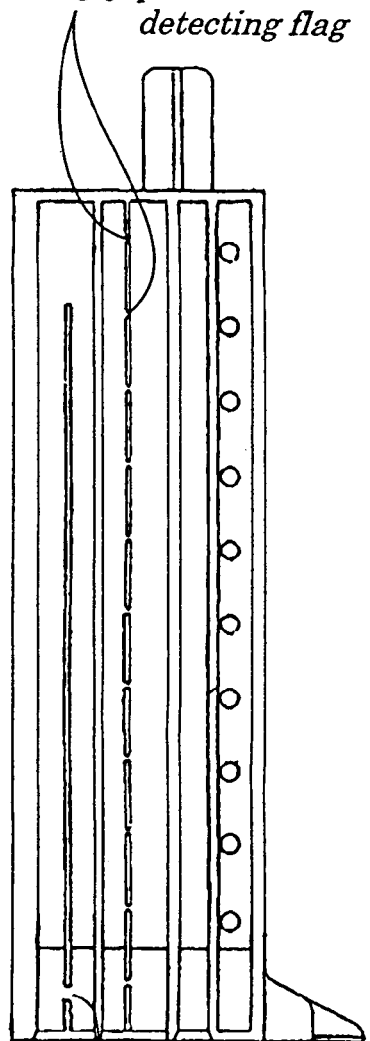
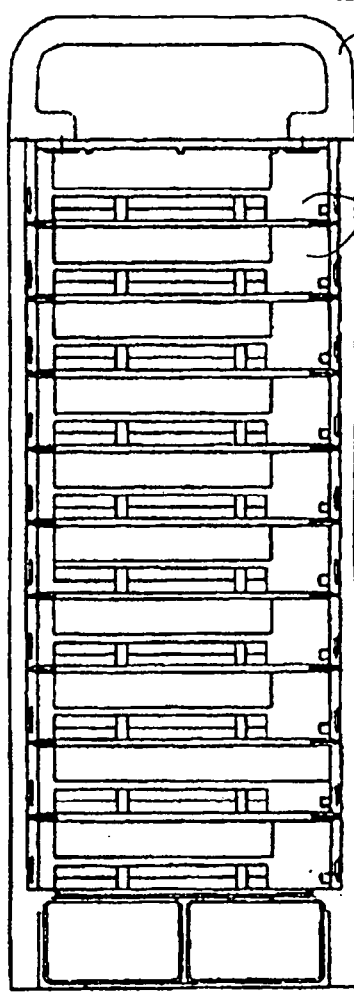

LIBRARY DEVICE

BACKGROUND OF THE INVENTION

1. Field of the Invention

The present invention relates to a library device to house a plurality of data cartridges such as a magnetic tape, magnetic disc, optical disc, or magneto-optical disc, or a like and to selectively extract a desired data cartridge out of these data cartridges and, by using a drive device internally mounted, to read and/or write data from or onto storage media housed in the desired data cartridge.

The present application claims priority of Japanese Patent Application No. 2004-014662 filed on Jan. 22, 2004, which is hereby incorporated by reference.

2. Description of the Related Art

Conventionally, a library device (called a "data storage system" or a like, in some cases) to house, for example, data cartridges such as tape cartridges in a plurality of cells in a magazine and to selectively extract a desired data cartridge out of these data cartridges and to read and write data stored in the data cartridge by using a drive device is known (see Japanese Patent Application Laid-open No. 2002-175655).

FIGS. 16A and 16B are diagrams showing a magazine 1200 to be used in the library device disclosed in the Japanese Patent Application Laid-open No. 2002-175655. FIG. 16A is a front view of the magazine 1200 and FIG. 16B is a left side view of the magazine 1200.

As shown in FIGS. 16A and 16B, the magazine 1200 has cells 1230 each housing one cartridge in such a manner in which the cells 1230 are stacked in a longitudinal direction and a grip 1280 for carrying the magazine 1200 which is attached on an upper face of a cabinet. The library device selectively extracts a cartridge, with the magazine 1200 being set in the library device, by using the cartridge extracting/transferring mechanism (not shown) mounted in the library device and transfers the selected cartridge to a cartridge reading/writing mechanism (not shown) in the library device so that the cartridge reading and writing mechanism reads and writes data stored in the cartridge.

On a side of the magazine 1200 are provided one magazine detecting flag 1260 to detect whether or not the magazine 1200 is set (that is, exists) in the library device and a plurality of position detecting flags 1250 to detect a relative position between the above cartridge extracting/transferring mechanism and each of the cells 1230. Both the magazine detecting flag 1260 and the position detecting flags 1250 are so constructed as to be of a slit shape by notching a plate-shaped structure formed integrally with the cabinet and each of the position detecting flags 1250 is mounted in a position corresponding to each of the cells 1230.

The conventional library device is made up of a sensor to detect the magazine detecting flag 1260 and another sensor to detect each of the position detecting flags 1250 and is configured so as to detect, by using these sensors, whether or not the magazine 1200 exists and a position of each of the cells 1230.

However, in the case of the conventional library device as described above, the magazine detecting flag 1260 and the position detecting flags 1250 are provided on a side of the magazine 1200 and, therefore, space to house these flags is required, causing the magazine 1200 to be large. As a result, space is required in the library device itself to house such a large magazine 1200, as a result, making it difficult to miniaturize the library device itself.

SUMMARY OF THE INVENTION

In view of the above, it is an object of the present invention to provide a library device being made to be small in size. It is another object of the present invention to provide the library device which is capable of providing accurate positioning relative to a position of each cell in a magazine being set even in the case of a small-sized magazine having no flag to detect a position of the cell and of preventing occurrence of a failure in operations.

According to a first aspect of the present invention, there is provided a library device including:

a drive device to read and/or write data from or onto storage media housed in a desired data cartridge out of a plurality of data cartridges;

at least one magazine including a plurality of cells arranged in one direction, each of which houses one of the plurality of the data cartridges;

a carrying unit that mounts a picker mechanism to extract or load the desired data cartridge from or into a corresponding cell in the at least one magazine and moves in the one direction and that selectively positions the picker mechanism to a position of one of the plurality of cells; and a magazine position detecting unit to detect a position of each of the plurality of cells in the at least one magazine;

wherein the magazine position detecting unit includes a plurality of positioning flags arranged in line along the one direction, each of which is mounted in a manner to correspond to a position of each of the plurality of cells in the at the least one magazine, in a state that the at least one magazine is properly located; at least one magazine position detecting flag placed in the line along the one direction and being displaced when directly contacting the at least one magazine, and a common position sensor that moves together with the carrying unit as a whole and detects positions of the plurality of positioning flags and the at least one magazine position detecting flag.

By configuring as above, since the flag used to detect a position of each of the cells in each of the magazines, which is conventionally mounted on a side of the magazines, is mounted on a side of the library device, the magazines can be made smaller in size when compared with the magazines having the conventional structures and, thus, miniaturization of the library device can be achieved. Additionally, by mounting the positioning flags and magazine position detecting flags on the same straight line, these two sensors can be detected by one common position sensor, not two pieces of position sensors, and it is made possible to miniaturize the library device.

In the foregoing, a preferable mode is one wherein the at least one magazine position detecting flag are mounted on one end portion side of the at least one magazine set in the library device and serve, when the at least one magazine is properly located, as the positioning flag for the cell existing nearest to the end portion, out of the plurality of cells in the at least one magazine.

By configuring above, it is not necessary to provide space in which one positioning flag is to be arranged.

Also, a preferable mode is one wherein the magazine positioning detecting unit includes a pendulum mechanism having at least one arm member being supported in a manner to be rotatable, in which the at least one arm member is provided with a directly-contacted portion directly contacting the at least one magazine and a sensor flag section serving as the at least one magazine position detecting flag.

Also, a preferable mode is one wherein control is exercised to detect presence or absence of the at least one magazine according to a position of the at least one magazine position detecting flag detected by the common position sensor.

Also, a preferable mode is one control is exercised to detect a position of the at least one magazine sets in the library device in accordance with a position of the at least one magazine position detecting flag detected by the common position sensor.

Also, a preferable mode is one wherein control is exercised to position the carrying unit to a position of each of the cells by presetting a distance from an original point of movement of the carrying unit to each of the positioning flags as a moving distance of the carrying unit and by moving the carrying unit from the original point to the moving distance.

Also, a preferable mode is one wherein control is exercised to check a position of the carrying unit based on a result from detection to be performed on the positioning flag by operating the common position sensor in synchronization with movement of the carrying unit.

By configuring as above, a real position of the carrying unit can be checked, which prevents a failure in positioning of the carrying unit.

Furthermore, a preferable mode is one wherein control is exercised to correct the predetermined moving distance of the carrying unit, by detecting a position of the at least one magazine sets in the library device based on a position of the at least one magazine position detecting flag detected by the common position sensor and by calculating an amount of positional deviation of the at least one magazine from an appropriate position at which the at least one magazine is properly located, based on the detection and by using an amount of positional deviation of the at least one magazine.

By configuring as above, even if the magazines are in a deviated position relative to an appropriate position due to factors of an increase or decrease of power to be used for housing the magazines, the carrying unit can be accurately positioned to a position of each of the cells in the magazines of the carrying unit, thus enabling prevention of occurrence of a failure.

With the above configuration, by mounting the magazine position detecting unit on a side of the library device, mounting of a flag to detect a cell on a magazine it self is not required and, as a result, the magazine is able to be made small and thus the library device is able to be miniaturized. Even in the case of employing the small-sized magazine, by using a magazine position detecting flag to be directly contacted to the magazine and to be displaced in order to detect a position of the magazine, by detecting an amount of positional deviation of the magazine having been already set, and by exercising control to correct a movement distance of the carrying unit, the carrying unit is able to be accurately positioned, thus achieving prevention of occurrence of an operational failure.

BRIEF DESCRIPTION OF THE DRAWINGS

The above and other objects, advantages, and features of the present invention will be more apparent from the following description taken in conjunction with the accompanying drawings in which:

FIGS. 16A and 16B are diagrams showing a magazine used in the conventional library device. FIG. 16A is a front view of the magazine and FIG. 16B is a left side view of the magazine.

DETAILED DESCRIPTION OF THE PREFERRED EMBODIMENTS

Best modes of carrying out the present invention will be described in further detail using various embodiments with reference to the accompanying drawings.

Embodiment

Best modes of carrying out the present invention will be described in further detail using various embodiments with reference to the accompanying drawings.

Figure 1:
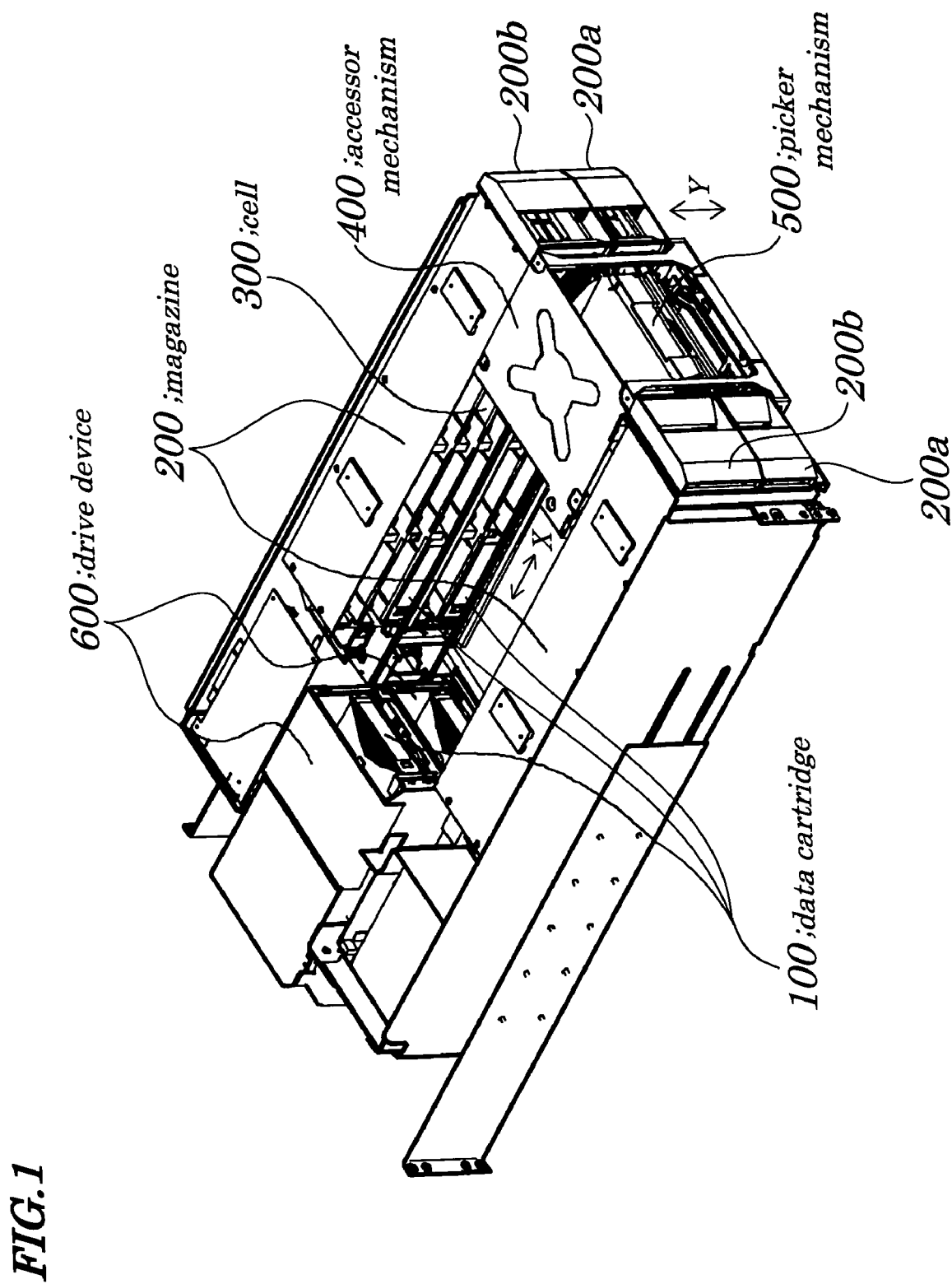
FIG. 1 is a perspective view schematically illustrating a library device of an embodiment of the present invention.

FIG. 1 is a perspective view schematically illustrating configurations of a library device according to an embodiment of the present invention. As shown in FIG. 1, the library device of the embodiment includes magazines 200 each having a plurality of cells 300 which houses data cartridges 100 being stacked with horizontal postures being kept, two drive devices 600 each reading and writing data from and on storage media in the data cartridges 100, and an accessor mechanism 400 to transfer the data cartridges 100.

In the embodiment, the two magazines 200 are arranged in a manner in which aperture (opening) portions of the cells 300 in one magazine 200 face aperture portions of the cells 300 in another magazine 200 and, further, the two stacked drive devices 600 are placed in the vicinity of one end of each of the two magazines 200, and the magazines 200 and drive devices 600 are arranged in a manner to be approximately U-shaped. The accessor mechanism 400 has a lifter mechanism 410 (see FIG. 3) used to move a picker mechanism 500 to load and unload the data cartridges 100 between the cells 300 and drive devices 600 in a Y direction shown in FIG. 3 and a linear mechanism 450 (see FIG. 3) used to move the lifter mechanism 410 in an X direction shown in FIG. 3. The lifter mechanism 410 (see FIG. 3 or a like) included in the accessor mechanism 400 moves between the two magazines 200 being placed in a manner to face each other in the X direction in FIG. 3.

In detail, each of the magazines 200 is further made up of a magazine 200a and a magazine 200b in which the magazine 200b having a total of twelve pieces (4 columns×3 stages) of the cells 300 overlies the magazine 200a having a total of eight pieces (4 columns×2 stages) of the cells 300. Each of the data cartridge 100 is so configured to be drawn out (extracted) independently and separately from the corresponding cell included in the magazines 200a or 200b. That is, in the embodiment, each of the magazines 200 has a total of twenty pieces of the cells 300 and, therefore, the two magazines 200 can house a total of forty pieces of the data cartridges 100. A lowest end of a rib (partition wall, not shown) mounted in the magazines 200 to partition a plurality of the cells 300 in a column direction is a distance away from a bottom plate of the cells 300 and clearance is created between the lowest end of the rib and the bottom plate of the cells 300 accordingly. This clearance enables a picker arm 521 (see FIG. 7) to access a notch 110 (see FIG. 2) formed in the data cartridge 100.

Moreover, any number of cells 300 held by the magazines 200 and any number of the stages of magazines 200 can be arbitrarily employed as the need arises in the present invention. The accessor mechanism 400 may be so configured that a distance of the movement in the X and Y directions can be changed appropriately according to the number of cells 300 held by the magazines 200 and the number of stages of the magazines 200.

Figure 2:
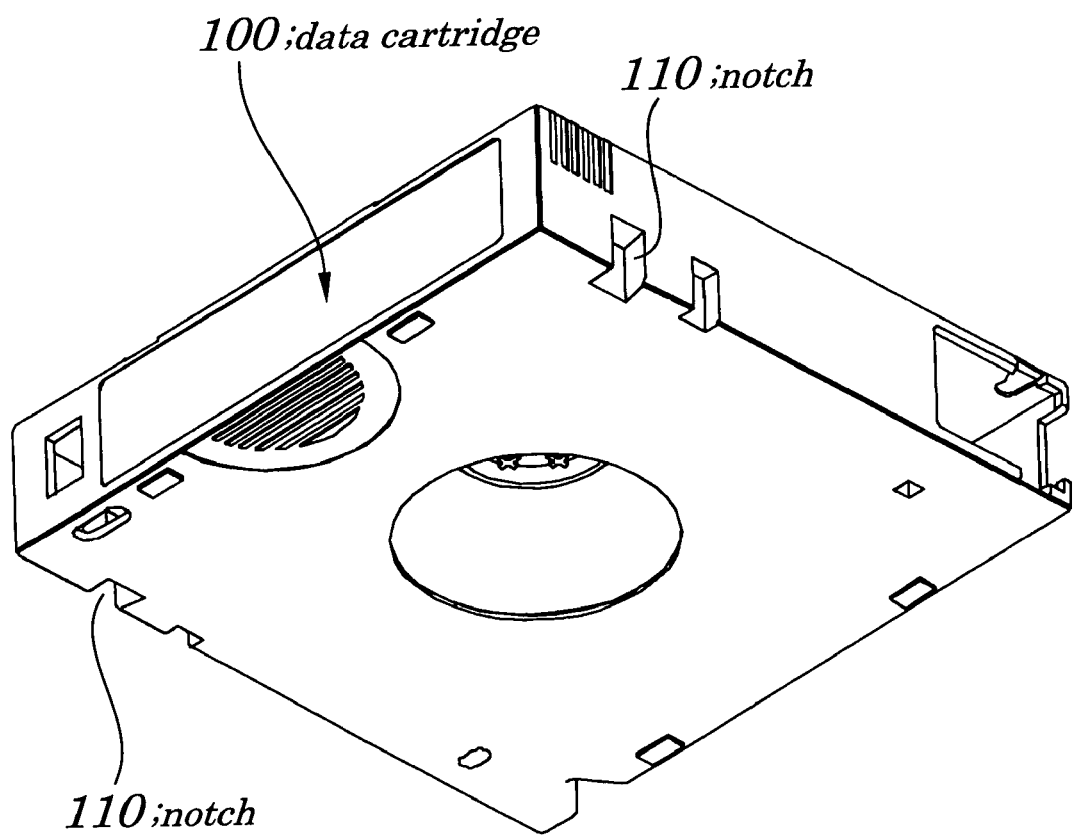
FIG. 2 is a perspective view showing one example of a data cartridge of the embodiment of the present invention.

The data cartridge 100 is a storage medium to read and write data shared by computers (not shown) being connected to the library device via communication lines to be used in such a LAN (Local Area Network), the Internet, or a like. Such the storage medium includes, for example, tape media such as an LTO (Linear Tape-Open), DLT (Digital Linear Tape) or a like, a DVD (Digital Versatile Disc) being placed in each housing, an MO (Magneto-Optical disk), disk media such as an MD (Mini Disk), or a like. FIG. 2 shows a data cartridge 100 having an LTO tape cartridge shape on both sides of which the notches 110 are formed.

The drive device 600 is a read/write device which reads data written in the data cartridge 100 mounted in the drive device 600 and writes data renewed by an operator of a computer onto the data cartridge 100. In the embodiment, though one drive device 600 is tracked upon another drive device 600, any number of drive devices 600 that the library device has may be mounted.

The picker mechanism 500 mounted in the accessor mechanism 400 performs operations of holding data cartridges 100 to load or unload the data cartridges 100 on or from the cells 300 in the magazines 200 and the drive device 600 and of changing a direction of the data cartridge 100 with its horizontal position being kept. The accessor mechanism 400 having the picker mechanism 500, by performing such operations, can transfer data cartridges 100 between the cells 300 and drive devices 600, among the cells 300, and among the drive devices 600.

Figure 3:
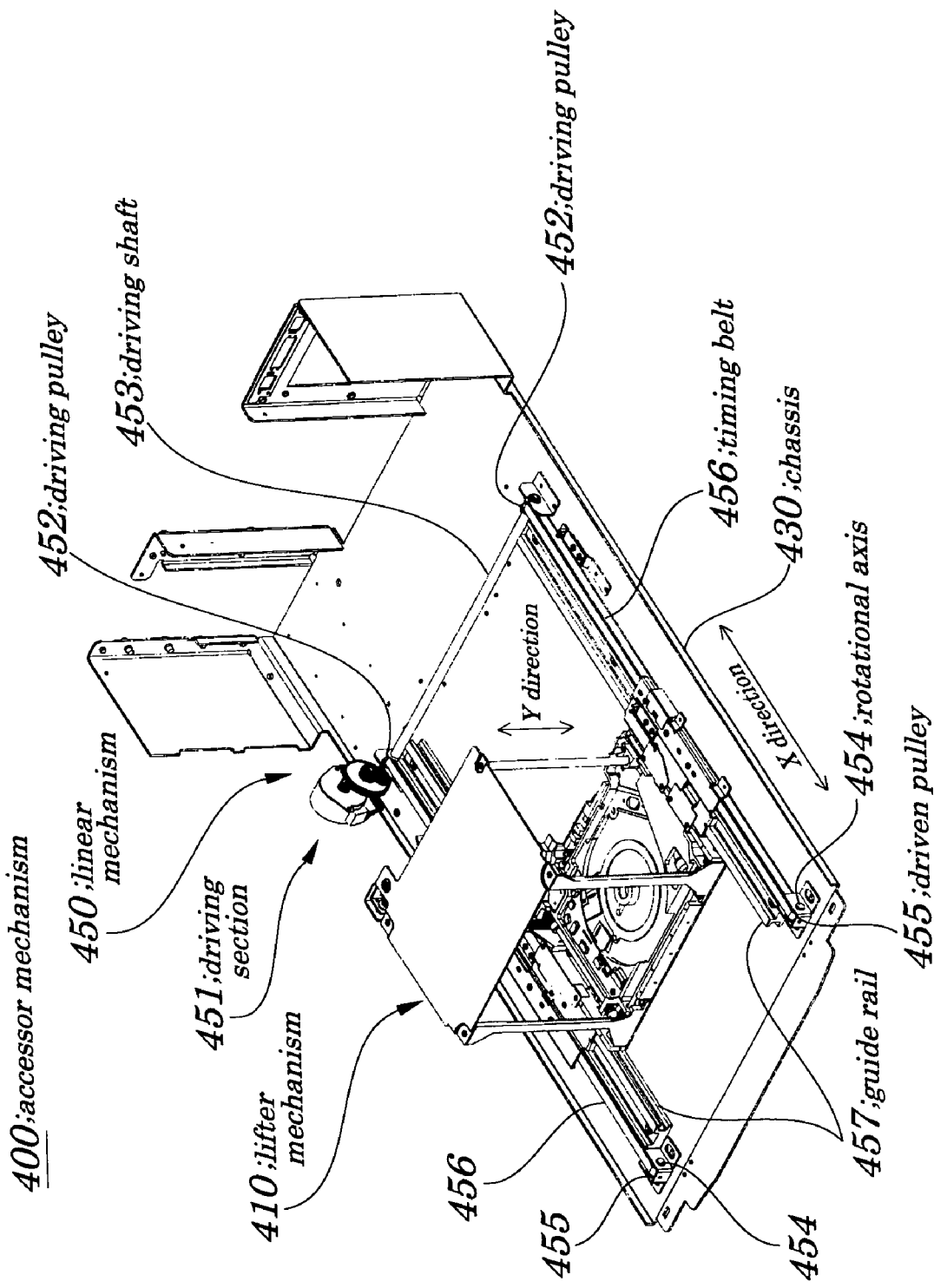
FIG. 3 is a perspective view showing detailed configurations of the accessor mechanism 400 shown in FIG. 1.

FIG. 3 is a perspective view for showing detailed configurations of the accessor mechanism 400 shown in FIG. 1. Moreover, in FIG. 3, for convenience of illustration, the picker mechanism 500 shown in FIG. 1 is omitted.

As shown in FIG. 3, the accessor mechanism 400 includes a picker mechanism 500 (not shown) to load and unload data cartridges 100 between the cells 300 and drive devices 600, the lifter mechanism 410 to hoist and lower the data cartridges 100 in an up and down direction (Y direction shown in FIG. 3), and the linear mechanism 450 to move the lifter mechanism 410 in a horizontal direction (X direction shown in FIG. 3). The lifter mechanism 410 and linear mechanism 450 are mounted in a chassis 430 in the library device.

The linear mechanism 450 includes a driving section 451 made up of a motor and a driving gear string (combined driving gears), a driving shaft 453 having a pair of driving pulleys 452 in the vicinity of its both side portions and being made to rotate to be driven by the driving section 451, a pair of driven pulleys 455 each being able to rotate about the rotational axis (shaft) 454, a pair of timing belts 456 each being wound round the driving pulley 452 and the driven pulley 455, and two guide rails 457 to guide the lifter mechanism 410 in the X direction shown in FIG. 3. A fixing portion of the lifter mechanism 410 is attached to a part of each of the timing belts 456.

In the linear mechanism 450 having such configurations as above, when a motor of the driving section 451 is driven and rotated in a normal or reverse direction, the driving shaft 453 is rotated by its driving power and the timing belts 456 each rotate in driven manner between the driving pulley 452 and the driven pulley 455.

The lifter mechanism 410 being fixed partially to each of the timing belts 456 moves along the two guide rails 457 in the X direction shown in FIG. 3.

Moreover, FIG. 3 shows the basic configuration of the linear mechanism 450 which operates to move the lifter mechanism 410 (accessor mechanism 400) to the X direction shown in FIG. 3. Descriptions of the configuration of the accessor mechanism 400 to perform positioning in a given position in the X direction shown in FIG. 3 are omitted here and are made later by referring to FIG. 10 in detail.

Figure 4:
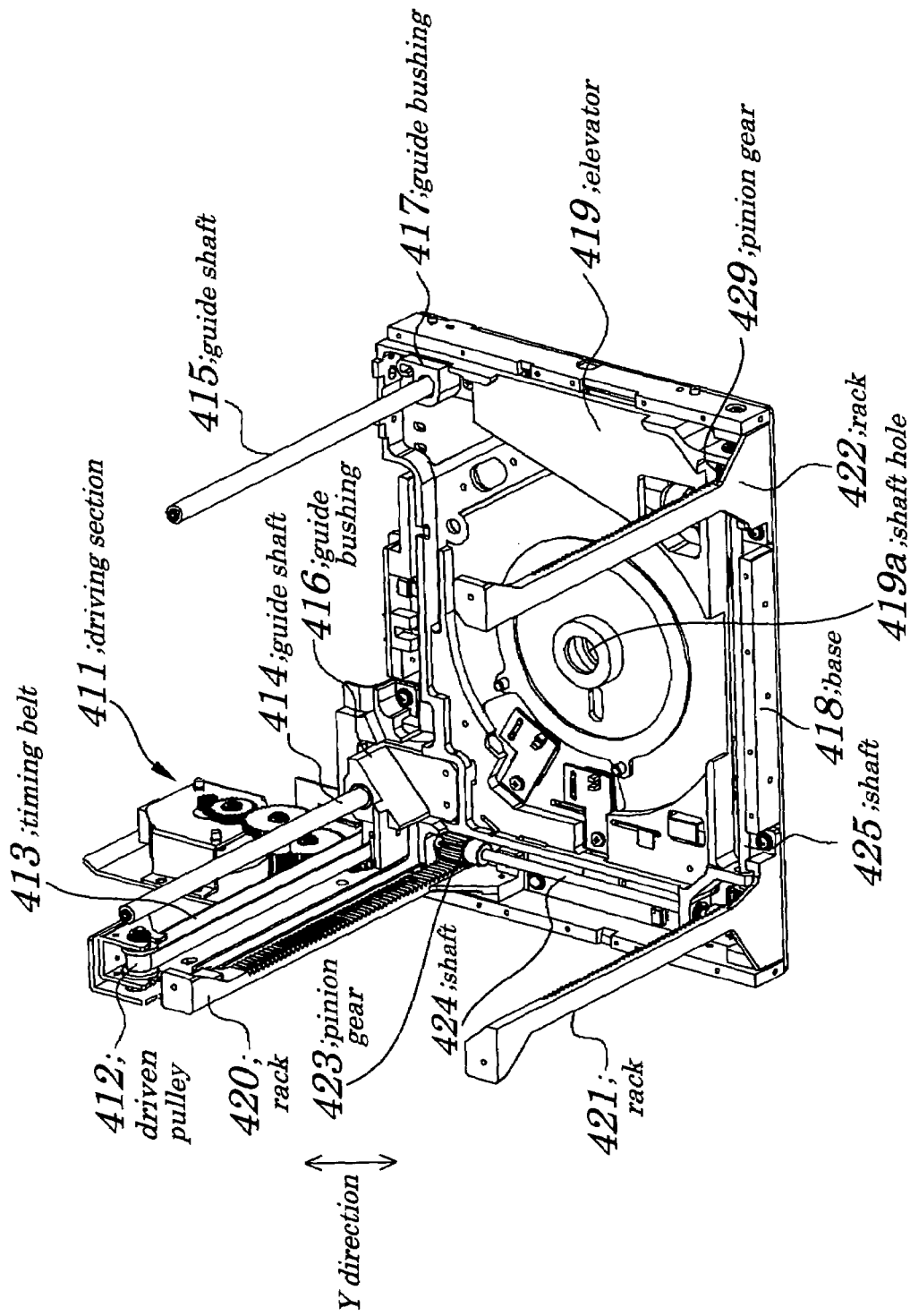
FIG. 4 is a diagram explaining configurations of the lifter mechanism shown in FIG. 3.
Figure 5:
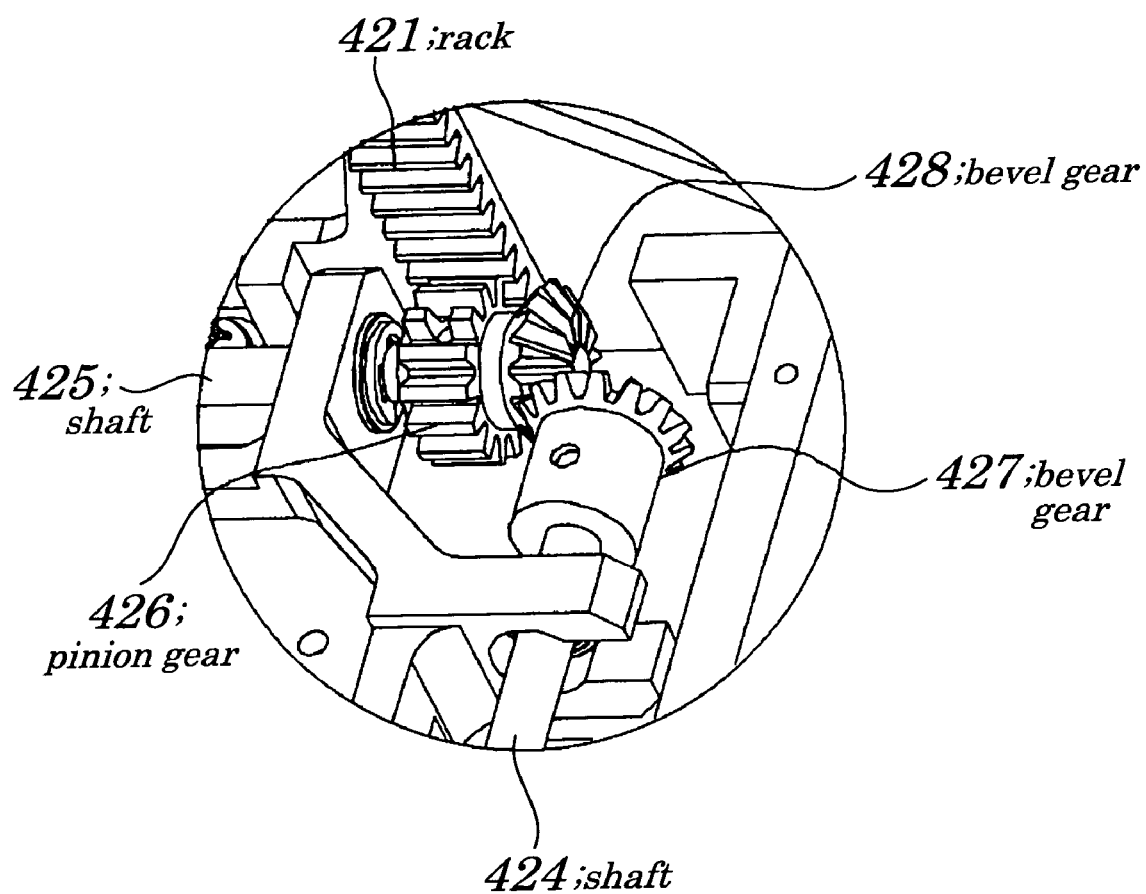
FIG. 5 is a diagram explaining configurations of the lifter mechanism shown in FIG. 3.
Figure 6:
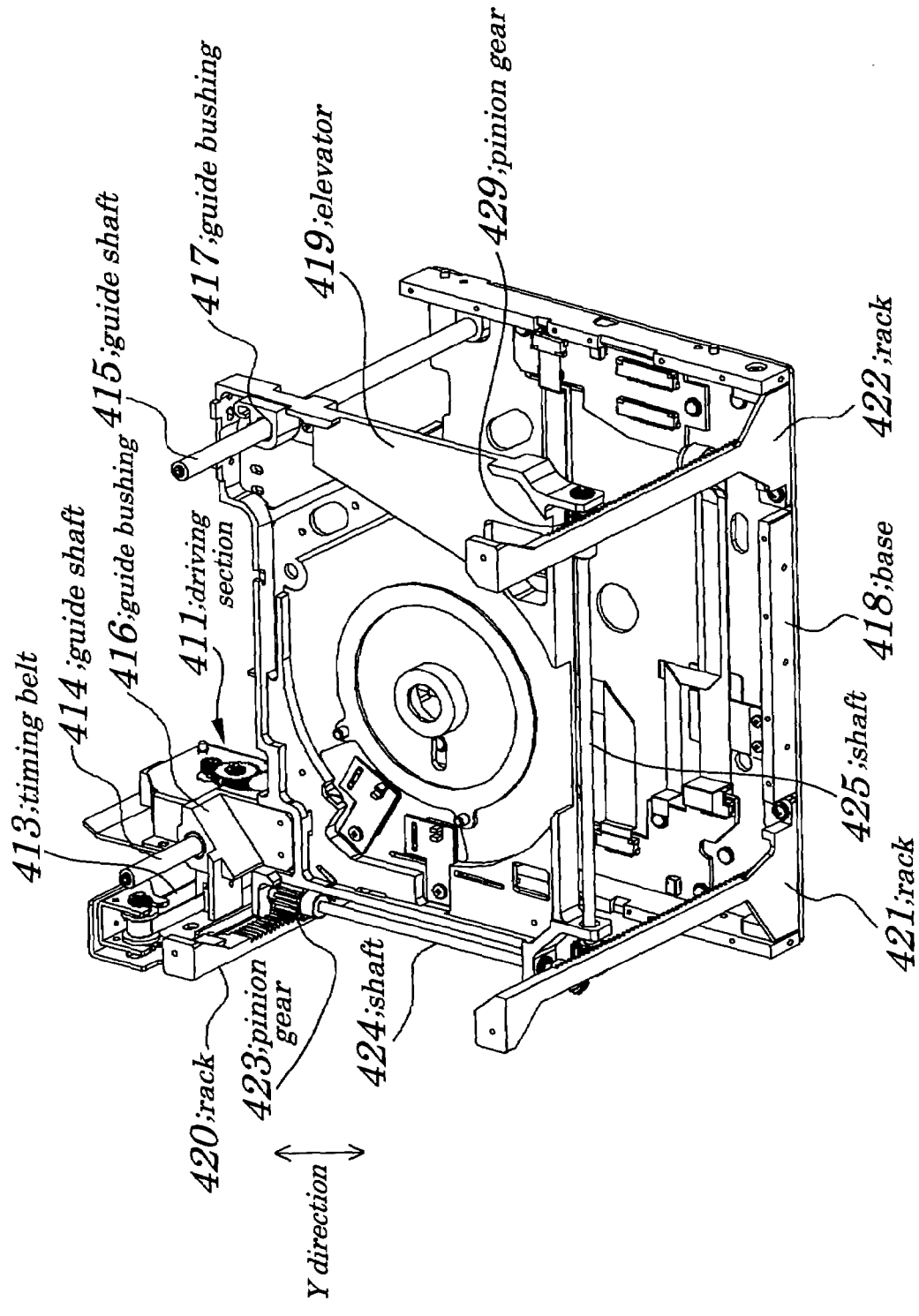
FIG. 6 is a diagram explaining configurations of the lifter mechanism shown in FIG. 3.

Next, configurations of the lifter mechanism 410 are described by referring to FIGS. 4 to 6. Moreover, in FIG. 4 and FIG. 6, for convenience of illustration, the lifter mechanism 410 is shown in a state in which descriptions of a ceiling plate (not shown) of the lifter mechanism 410 are omitted.

As shown in FIG. 4, the lifter mechanism 410 has racks 420, 421, and 422 mounted in three corners out of four corners on a base 418, a guide shaft 415 mounted in one corner out of four corners on the base 418, the base 418 having a guide shaft 414 mounted in the vicinity of the rack 420, and an elevator 419 being movable in a Y direction shown in FIG. 4 with reference to the base 418. The elevator 419 plays a role as a supporting base to support the picker mechanism 500. The elevator 419 has guide bushings 416 and 417 which slide along the guide shafts 414 and 415. The picker mechanism 500 (shown in FIG. 1) is mounted on the elevator 419.

As shown in FIG. 4, the base 418 includes a driving section 411 made up of a motor and driving gear string ((combined driving gears) and a timing belt 413 being wound round a driving pulley (not shown) being made to rotate and to be driven by the driving section 411 and a driven pulley 412 being mounted so as to be rotational in an upward position of the driving pulley. An end portion of the guide bushing 416 is fixed partially on the timing belt 413.

The elevator 419 moves up and down by rotation of a shaft 424 having a pinion gear 423 engaging with the rack 420 on one end of the shaft 424 in a manner in which the shaft 424 can rotate and by rotation of a shaft 425 having a pinion gear 426 (FIG. 5) engaging with the rack 421 and a pinion gear 429 engaging with the rack 422 on both ends of the shaft 425 in a manner in which the shaft 425 can rotate. The elevator 419 is supported by the shafts 424 and 425. As shown in FIG. 5 in an enlarged form, two shafts 424 and 425 are connected to each other so as to form an angle of about 90° via bevel gears 427 and 428 mounted on ends of the shafts 424 and 425, respectively.

In the lifter mechanism 410 so configured as described above, when a motor (not shown) of the driving section 411 is made to rotate in a normal or reverse direction to be driven, a driving pulley (not shown) rotates by its driving force and the timing belt 413 rotates in a driven manner. Then, as shown in FIG. 6, the elevator 419 being fixed via the guide bushing 416 on a part of the timing belt 413 moves along the two guide shafts 414 and 415 in a Y direction as shown in FIG. 6. At this time point, the pinion gear 423 of the shaft 424 and pinion gears 426 and 429 of the shaft 425 move on the racks 420, 421, and 422 in a rolling manner. The elevator 419, since it has the shafts 424 and 425, pinion gears 423, 426, and 429, and bevel gears 427 and 428 being constructed as above, can move to the Y direction as shown in FIG. 6 while being kept parallel to the base 418.

Figure 7:
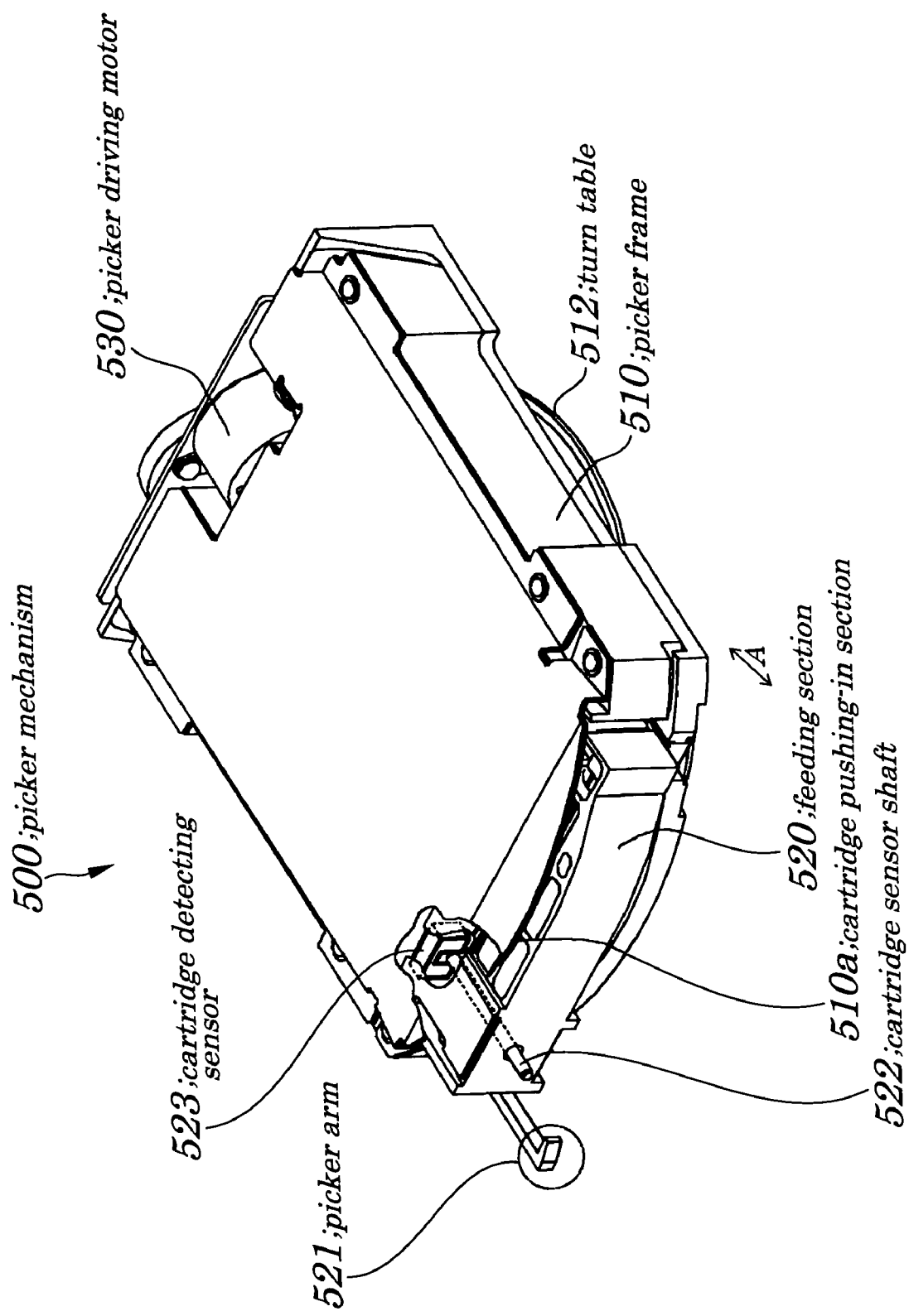
FIG. 7 is a perspective view, having a partially cutaway portion, explaining configurations of the picker mechanism shown in FIG. 1.
Figure 8:
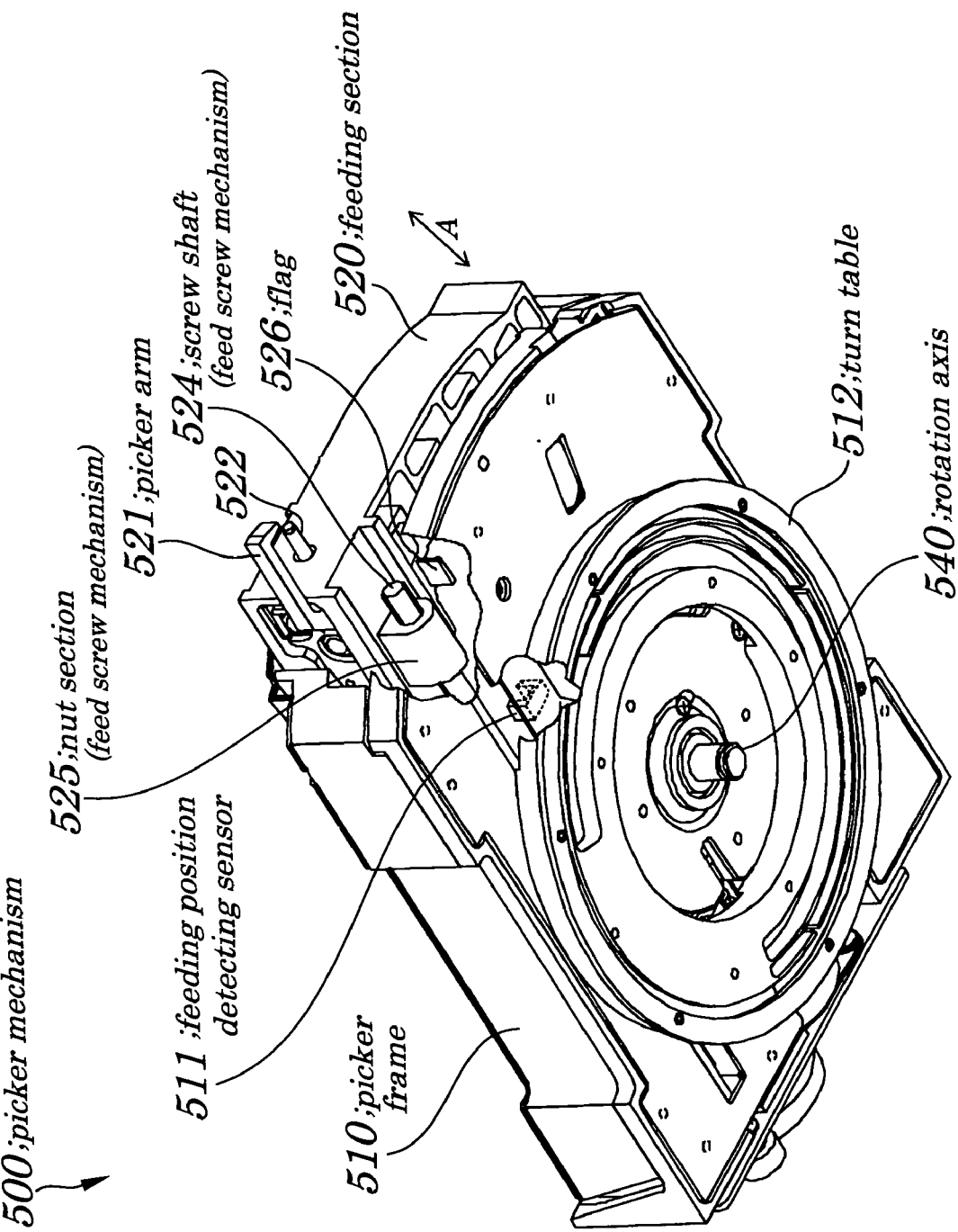
FIG. 8 is also a perspective view, having a partially cutaway portion, explaining configurations of the picker mechanism shown in FIG. 1.

Next, the picker mechanism 500 is described. FIGS. 7 and 8 each are a perspective view, having a partially cutaway portion, illustrating the picker mechanism 500 shown in FIG. 1.

As shown in FIG. 7, the picker mechanism 500 includes a picker frame 510 having a turntable 512 on its lower face and a feeding section 520 housed in the picker frame 510 and being movable to an "A" direction shown in FIG. 7. A canopy-like cartridge pushing-in section 510a is provided in the vicinity of an aperture (opening) that houses the feeding section 520 in the picker frame 510.

The feeding section 520 is provided with a picker arm 521 having a hook (not shown) used to be latched to a notch 110 (see FIG. 2) of the data cartridge 100 on its one side. Also, the feeding section 520 has a cartridge sensor shaft 522 that ordinarily extrudes from a top end face of the feeding section 520 as shown in FIG. 7 and a cartridge detecting sensor 523 to detect the presence of a rear end of the cartridge sensor shaft 522. The cartridge detecting sensor 523 does not detect the presence of the rear end of the cartridge sensor shaft 522 when the cartridge sensor shaft 522 extrudes from a top end face of the feeding section 520 as shown in the same figure. The cartridge sensor shaft 522, when the feeding section 520 comes into contact with the data cartridge 100 (see FIG. 2), is pushed into the feeding section 520. At this time point, the cartridge detecting sensor 523 detects the presence of the rear end of the cartridge sensor shaft 522. The cartridge detecting sensor 523, thus by detecting the presence of the rear end of the cartridge sensor shaft 522, detects whether or not the feeding section 520 is in contact with the data cartridge 100.

As shown in FIG. 8, a nut section 525 on an inner radius face of which a female screw is formed and a flag 526 used to detect a feeding position of the feeding section 520 are provided on a lower face side of the feeding section 520. On the other hand, within the picker frame 510 are mounted a screw shaft 524 made to rotate to be driven by a picker driving motor 530 (see FIG. 7) and a feeding position detecting sensor 511 to detect the presence of the flag 526 in the feeding section 520. Furthermore, in a center of the turn table 512 attached to a lower face of the picker frame 510 is mounted a rotation axis (shaft) 540 to rotate the picker mechanism 500 in the lifter mechanism 410 (see FIG. 4).

The screw shaft 524 and nut section 525 make up a feed screw mechanism (feeding section driving mechanism) which moves the feeding section 520 in an "A" direction shown in FIG. 8 relative to the picker frame 510. The screw shaft 524 is made to rotate and to be driven by the picker driving motor 530 in the picker frame 510 in a normal or reverse direction. The nut section 525 moves in synchronization with rotation of the screw shaft 524 along the screw shaft 524 in the "A" direction shown in FIG. 8. The feeding section 520 can be made to move by the feed screw mechanisms (the screw shaft 524 and the nut section 525) in the "A" direction shown in FIG. 8 relative to the picker frame 510.

Moreover, the feeding position detecting sensor 511, when the feeding section 520 is fully housed in the picker frame 510 (position obtained when the feeding section 520 is fully housed in the picker frame 510 is called a "home position") is so configured as to detect the presence of the flag 526. In the embodiment, the picker driving motor 530 is made up of a stepping motor. Therefore, a moving distance (feeding position) from the home position of the feeding section 520 can be managed based on the number of pulses input into the picker driving motor 530 to rotate the screw shaft 524.

Figure 9:
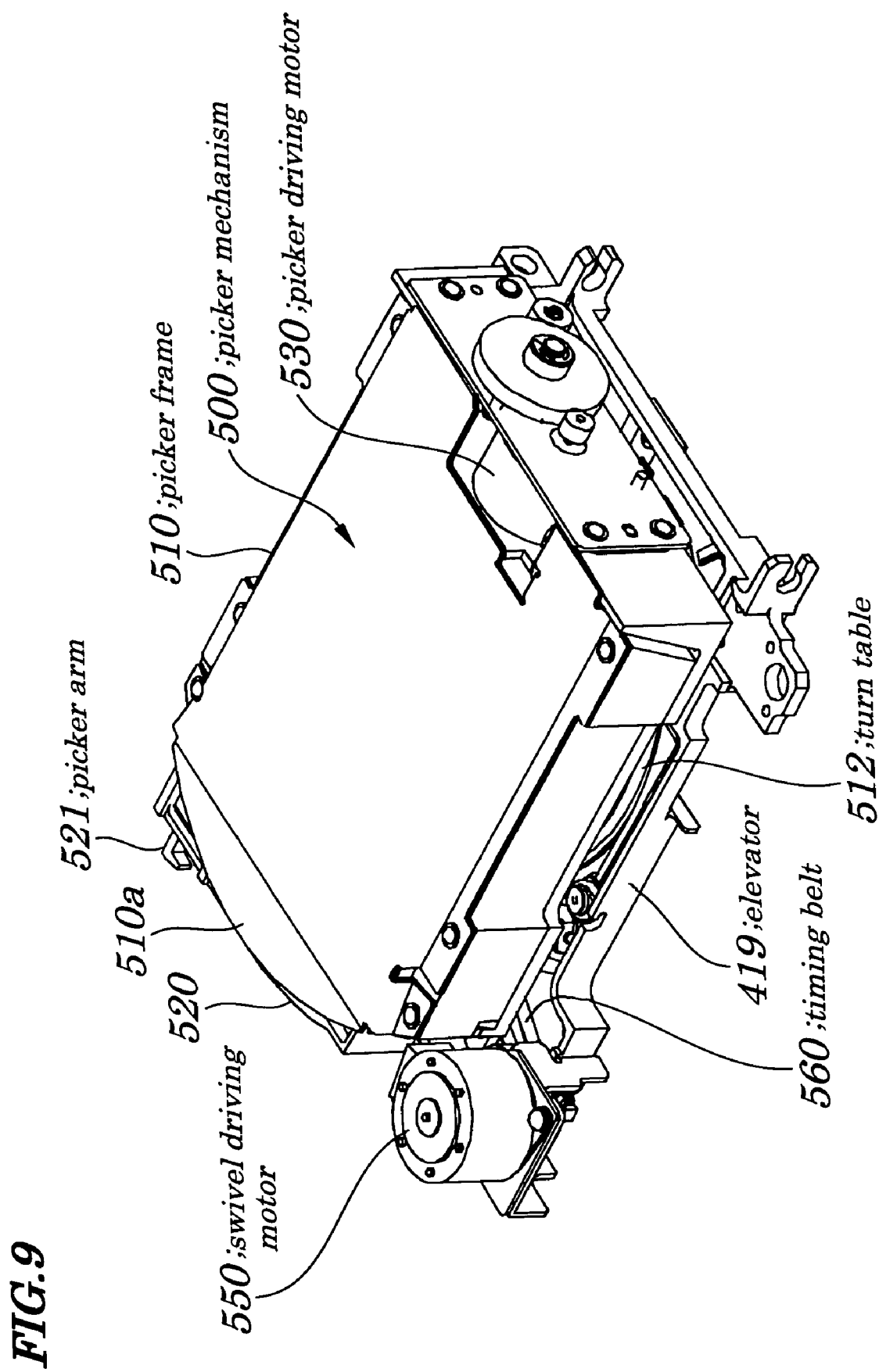
FIG. 9 is a perspective view explaining configurations of the picker mechanism shown in FIG. 1.

FIG. 9 is a perspective view showing a state in which the picker mechanism 500 is mounted on the elevator 419 in the lifter mechanism 410 shown in FIG. 7.

The picker mechanism 500 is mounted on the elevator 419 with the rotation axis 540 (see FIG. 8) being attached on a lower side of the picker mechanism 500 inserted in a shaft hole 419a (see FIG. 4) formed in the elevator 419. Thus, the picker mechanism 500 is supported on the elevator 419 in a manner to be freely rotated about the rotation axis 540. Moreover, though not shown in FIG. 4, the elevator 419 in the lifter mechanism 410 has a swivel driving motor 550 to rotate and drive the picker mechanism 500 by using the elevator 419. The swivel driving motor 550 makes up a swivel mechanism by being connected to the rotation axis 540 through a timing belt 560, in which, by rotating and driving the swivel driving motor 550 in a normal or reverse direction, it is made possible for the picker mechanism 500 to be rotated about the rotation axis 540 on the elevator 419 in a normal and reverse direction.

Moreover, in the embodiment, the swivel driving motor 550 is also made up of a stepping motor and an amount of rotation from a predetermined position of the picker mechanism 500 can be managed based on the number of pulses input in the swivel driving motor 550.

Hereinafter, a mechanism being a feature of the present invention operated to detect presence or absence of magazines 200 and configurations to perform positioning to a specified position in the accessor mechanism 400 (see FIG. 1) are described.

Figure 10:
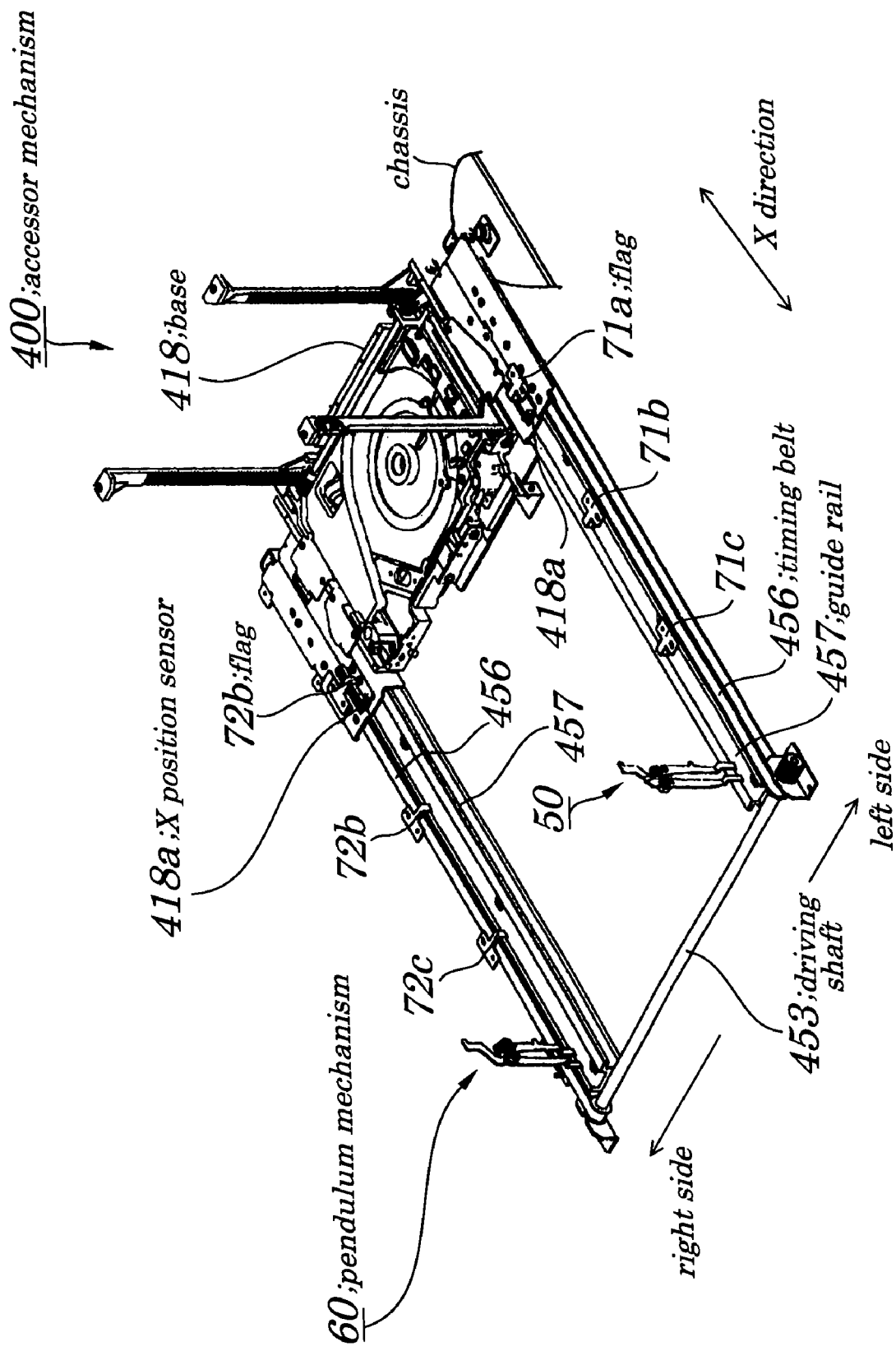
FIG. 10 is a perspective view of configurations to achieve positioning of the accessor mechanism.

FIG. 10 is a perspective view of configurations to achieve positioning of the accessor mechanism 400, in which flags 71a, 71b, and 71c, and 72a, 72b, and 72c, pendulum mechanisms 50 and 60, in addition to configurations of the library device shown in FIG. 3 are shown.

As shown in FIG. 10, in each of the guide rails 457 on a side where the driving shaft 453 is placed, are provided the pendulum mechanisms 50 and 60 used to detect presence and absence of the magazines 200 and to detect a position of each of the set magazines 200. Moreover, the pendulum mechanisms 50 and 60 are so arranged that the pendulum mechanisms 50 and 60 respectively on the R (right) side and on the L (left) side are in symmetry and their configurations are the same and, therefore, the pendulum mechanism 50 on the L (left) side is taken as an example.

Three flags 71a, 71b, and 71c and three flags 72a, 72b, and 72c each being used to detect a position of each of the cells 300 in each of the magazines 200 (see FIG. 1) in the X direction shown in FIG. 10 are arranged in a fixed state on the chassis in the library device on the R (right) and L (left) sides along each of the guide rails 457, respectively. Each of the three flags 71a, 71b, and 71c on the L (left) side is arranged in a position corresponding to each of three columns of the cells 300, which is placed on a side being apart from the drive device 600, out of each of four columns of the cells 300 in the magazines 200 on the L (left) side. Each of three flags 72a, 72b, and 72c on the R (right) side is arranged in a position corresponding to each of three columns of the cells 300, which is placed on a side being apart from the drive device 600, out of each of four columns of the cells 300 in the magazines 200 on the R (right) side.

Each of the flags 71a to 71c and of the flags 72a to 72c is made up of a plate-shaped member and each of their top portions being bent toward lower positions shown in FIG. 10 serves as a flag. A width of each of their top portions is the same in dimension. One X position sensor 418a to detect a position of each of the flags 71a to 71c and 72a to 72c is arranged on each of both sides of the base 418 in the accessor mechanism 400, which is made up of a light receiving sensor (not shown). This causes the X position sensor 418a to move together with the accessor mechanism 400 as a whole and to pass by each of the flags 71a to 71c and 72a to 72c to detect each of the flags 71a to 71c and 72a to 72c.

Though not shown in FIG. 10, an original point sensor (not shown) to set an original point of movement in the accessor mechanism 400 is fixed on the chassis of the library device, which is so configured as to detect a position of a flag (not shown) mounted on a lower face of the base 418 passing in an upper portion. The position of the original point sensor is not limited, however, in the embodiment, the original point sensor is located in an intermediate position between the flag 71c and the pendulum mechanism 50.

Figure 11A:
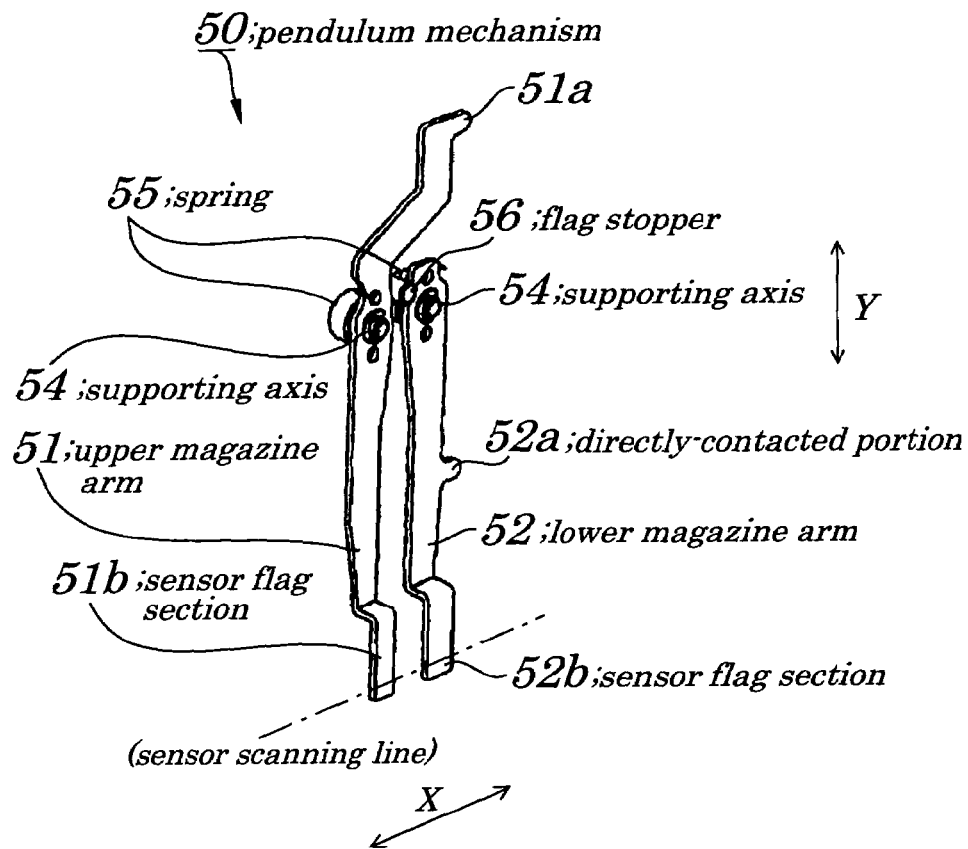
FIGS. 11A and 11B are diagrams illustrating the pendulum mechanism and FIG. 11A is a perspective view of configurations of the pendulum mechanism and FIG. 11B is a plane view of the pendulum mechanism in a normal state.
Figure 11B:
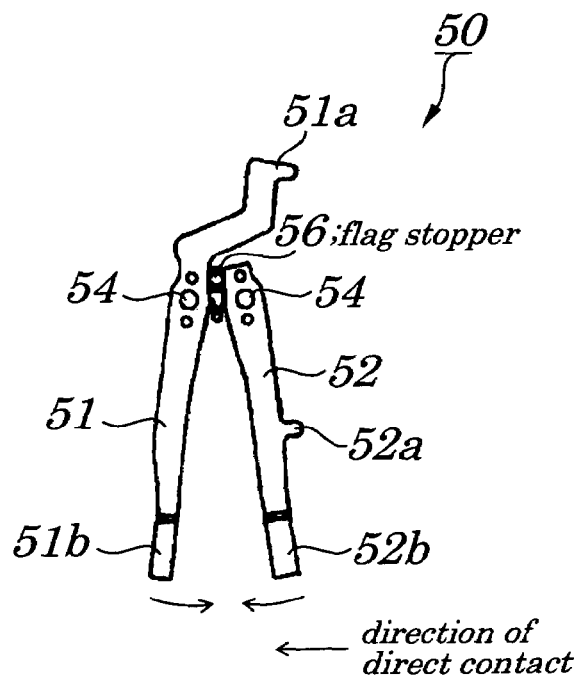
Figure 12:
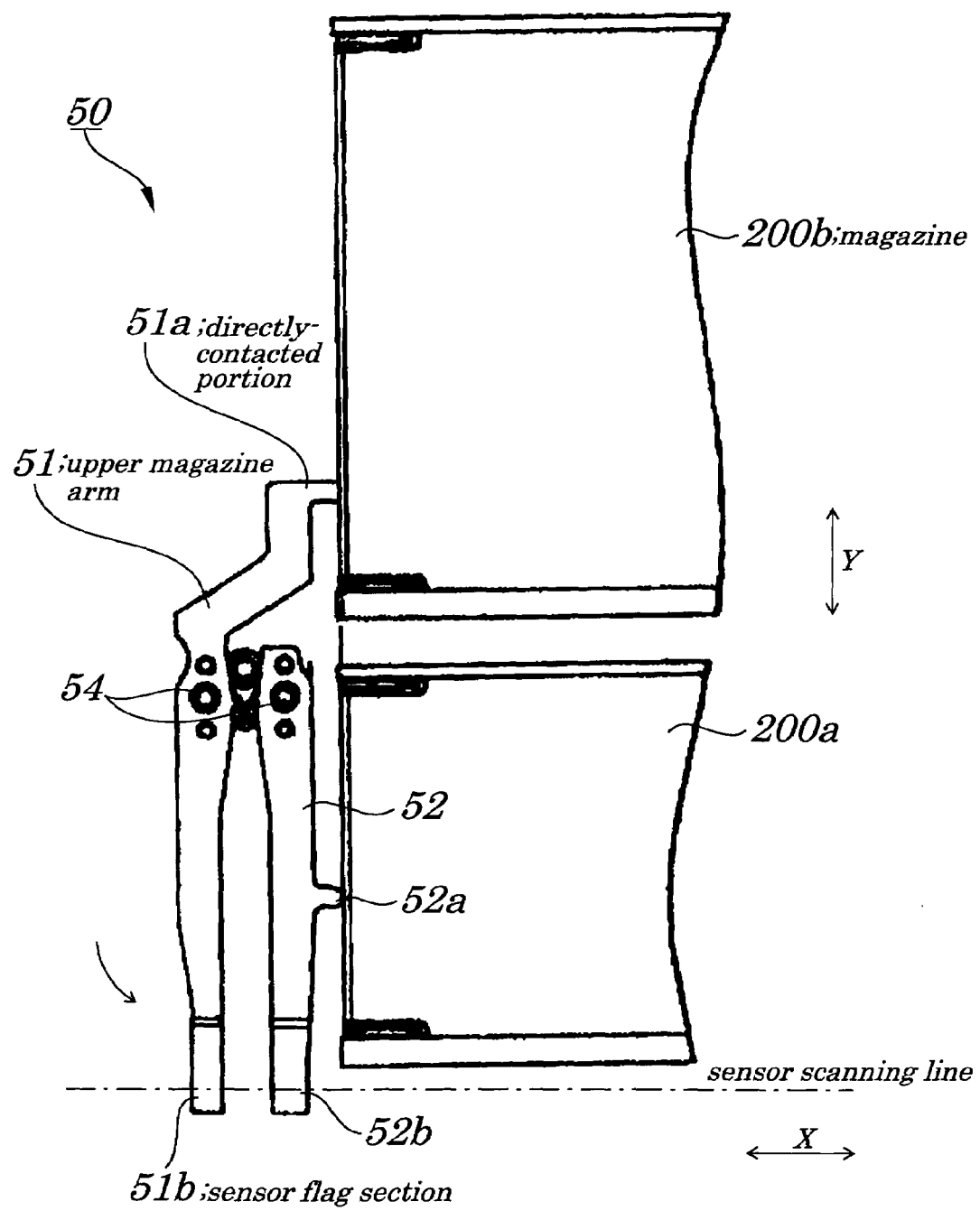
FIG. 12 is a diagram explaining a principle to detect a magazine by using the pendulum mechanism shown in FIG. 11 and showing a state in which the two upper and lower magazines 200a and 200b have been set at an appropriate position.

FIGS. 11A and 11B are diagrams illustrating the pendulum mechanism 50. FIG. 11A is a perspective view of configurations of the pendulum mechanism 50. FIG. 11B is a plane view of the pendulum mechanism 50 in a normal state. FIG. 12 is a diagram explaining a principle to detect a magazine 200 by using the pendulum mechanism 50 shown in FIG. 11 and showing a state in which the two upper and lower magazines 200a and 200b have been set to an appropriate position at which the magazines 200a and 200b should be properly located. In this state, as shown in FIG. 12, end portions of the two magazines 200a and 200b are in the same position in the X direction shown in FIG. 12.

As shown in FIG. 12, the pendulum mechanism 50 has an upper magazine arm 51 and a lower magazine arm 52 each being supported by each of supporting axes 54 and each of the upper magazine arm 51 and lower magazine arm 52 is directly contacted to each of the magazines 200a and 200b.

An intermediate portion of the upper magazine arm 51 is supported by the supporting axis 54. A directly-contacted portion 51a being in direct contact with the upper magazine 200b is formed in its upper end and a sensor flag section 51b being detected by the X position sensor 418a (see FIG. 10) is formed in its lower end. The sensor flag section 51b is used as a flag to detect a position of the cells 300 (see FIG. 1) being positioned nearest to the drive device 600. That is, the sensor flag section 51b performs the same functions as those of the described flags 71a to 71c and, by configuring as above, it is made possible to make the library device space-saving and its configurations simplified.

An upper end of the lower magazine arm 52 is supported by the supporting axis 54. A directly-contacted portion 52a being in direct contact with the lower magazine 200a is formed in an intermediate position of the lower magazine arm 52 and a sensor flag section 52b is formed in its lower end. Additionally, in the embodiment, the pendulum mechanism 50 has two arms 51 and 52 (upper magazine arm 51 and lower magazine arm 52), however, the number of arms may be changed, as appropriate, depending on the number of pieces of the magazines 200.

Each of the upper magazine arm 51 and lower magazine arm 52, as shown in FIG. 11, is so constructed that the two arms 51 and 52 (upper magazine arm 51 and lower magazine arm 52) open to a maximum width by a positional change of each of the directly-contacted portions 51a and 52a to the magazine side (to the right in FIG. 11), in an initial state (that is, the state in which the pendulum mechanism 50 has not been set to the magazines 200) by actions of a spring 55 being fixed to each of the supporting axes 54, and of a flag stopper 56 interposed between both the supporting axes 54.

Moreover, the "sensor scanning line" shown in FIG. 11 represents a track on which scanning is performed by the X position sensor 418a mounted in the accessor mechanism 400 (see FIG. 10) and each of the flags 71a to 71c and each of the sensor flag sections 51b and 52b (shown in FIG. 10) are arranged so as to be positioned on the sensor scanning line. By configuring as above, each of the flags 71a to 71c and each of the sensor flag sections 51b and 52b can be detected only by one X position sensor 418a.

In the pendulum mechanism 50 constructed as above, when the magazines 200a and 200b are set to the pendulum mechanism 50, each of its directly-contacted portions 51a and 52a directly contacts each of end portions of the magazines 200a and 200b, thus causing the above upper magazine arm 51 and lower magazine arm 52 to be rotated around the supporting axis 54 and to change their positions. According to the positional change of the upper magazine arm 51 and 5lower magazine arm 2, positions of the sensor flag sections 51b and 52b mounted respectively at lower ends of the upper magazine arm 51 and lower magazine arm 52 are changed on the sensor scanning line in the X direction shown in FIG. 11. As a result, when positions of the sensor flag sections 51b and 52b are detected by the X position sensor 418a (see FIG. 10), presence or absence of each of the magazines 200a and 200b can be detected.

Next, operations of detecting, when the magazines 200 are set in a deviated state, an amount of its positional deviation by using the pendulum mechanism 50 are described below.

Figure 13:
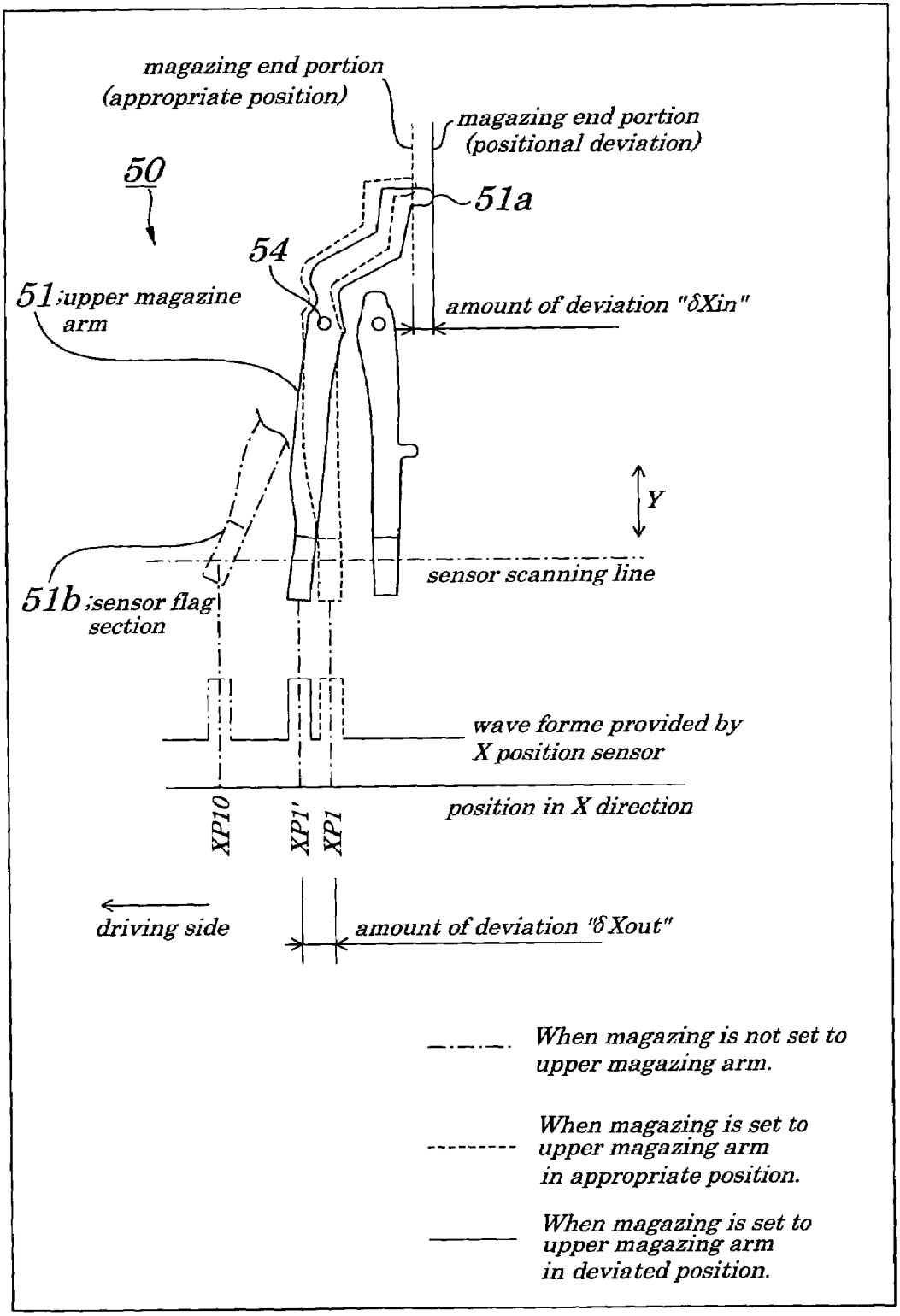
FIG. 13 is a schematic diagram explaining detection of a position of a magazine by using the pendulum mechanism.

FIG. 13 shows one example of a state in which the upper magazine arm 51 is displaced in rotation at various positons. In FIG. 13, a state in which the magazine 200 is not set to the upper magazine arm 51 is shown by alternate long and short dash lines, a state in which the magazine 200 is set to the upper magazine arm 51 in an appropriate position is shown by dotted lines, and a state in which the magazine 200 is set to the upper magazine arm 51 in a deviated position is shown by solid lines.

When the sensor flag section 51b of the upper magazine arm 51 having various changed positions is detected by using the X position sensor 418a (see FIG. 10), a waveform as shown in FIG. 13 is obtained as a result from the detection by the X position sensor 418a, which enables the detection of the position of the sensor flag section 51b in the X direction shown in FIG. 13. Here, as shown in the waveform in FIG. 13, a position of the sensor flag section 51b is detected in a position of "XP10" (at time when the magazine 200 is not set), in a position of "XP1" (at time when the magazine 200 is set in an appropriate position at which the magazine 200 should be properly located, that is, properly located), and in a position of "XP1'" (at time when the magazine 200 is set in a deviated position). A distance between the positions "XP1" and "XP1'" is given as an amount of positional deviation "δ Xout" and an amount of positional deviation of the magazine 200 occurring at this time point is "δ Xin".

A relation between the amount "δ Xin" of positional deviation of the magazine 200 and the amount of "δ Xout" of positional deviation of the detected sensor flag section 51b is predetermined by a geometric shape of the upper magazine arm 51; that is, by a ratio of a length between the supporting axis 54 and the directly-contacted portion 51a to a length between the supporting axis 54 and the sensor flag section 51b. The amount of "δ Xin" of the positional deviation of the magazine 200 can be calculated by multiplying the amount of "δ Xout" of positional deviation of the detected sensor flag section 51b by a specified coefficient set according to the geometric shape of the upper magazine arm 51. That is, the equation for the calculation is given as follows:

An amount "δ Xin" of positional deviation of the magazine 200=an amount "δ Xout" of positional deviation of the detected sensor flag section 51b×a specified coefficient.

By calculating using a control device (not shown) in the library device, the amount "δ Xin" of positional deviation of the magazine 200 can be obtained from the amount "δ Xout" of positional deviation of the detected sensor flag section 51b. Moreover, in the above embodiment, the description is presented using the upper magazine arm 51 as the example, however, the lower magazine arm 52 can be also used according to the same principles as above.

Figure 14:
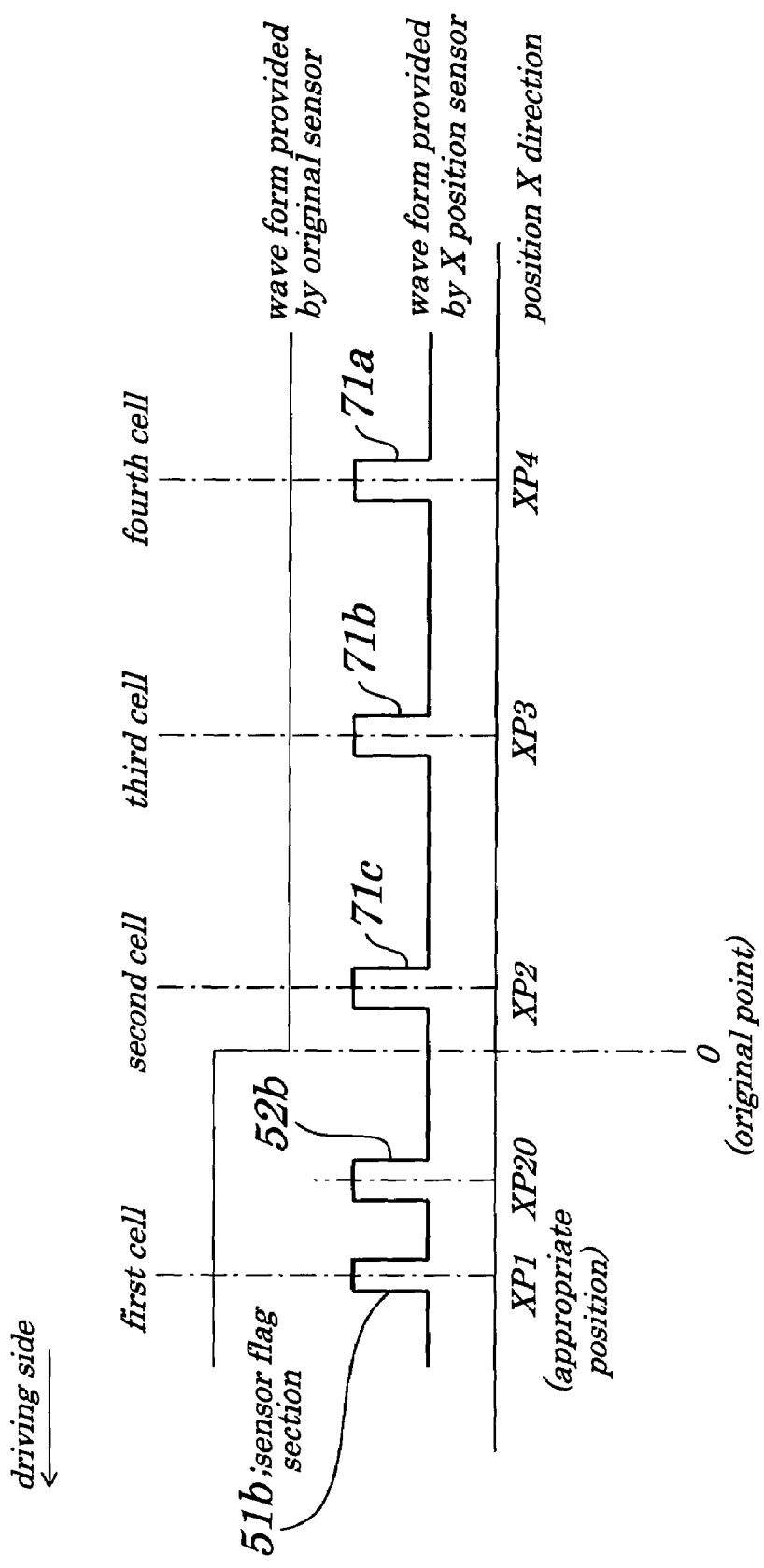
FIG. 14 is a diagram explaining detection of a flag by an X position sensor and detection of an original point by an original point sensor.

FIG. 14 is a diagram explaining detection of a flag by the X position sensor 418a and detection of an original point by an original point sensor (not shown). Additionally, a position of a column of each of the cells 300 (see FIG. 1) of the magazine 200 is represented as "first to fourth cells" in order of places from a driving side (a side of the drive device 600).

When the original sensor (not shown) described by referring to FIG. 10 and the X position sensor 418a are operated to move the accessor mechanism 400 to the X direction shown in FIG. 14, a position of an original point serving as a home position of movement of the accessor mechanism 400 and a position of each of the flags 71a to 71c and the sensor flag sections 52b to 51b are shown as the waveform shown in FIG. 14. Here, the position "XP1" shown in FIG. 14 is the same as shown in FIG. 13 which represents a position of the sensor flag section 51b to be obtained when the magazine 200 is set in the appropriate position. The position "XP20" shows a position of the sensor flag section 52b and the positions "XP2" to "XP4" show positions of the flags 71a to 71c, respectively. Each of the positions "XP1" to "XP4" corresponds to each column of the cells 300 (see FIG. 1). Additionally, since the flags 71a to 71c are mounted on the chassis of the accessor mechanism 400 in a fixed manner, the positions of the "XP2" to "XP4" remain unchanged. On the other hand, in some cases, the position "XP1" is displaced, for example, to the position "XP1'" depending on the set position of the magazine 200 described in FIG. 13.

The movement of the accessor mechanism 400 of the embodiment is accomplished by using an original point detected by the original sensor (not shown) as a reference. The movement is realized by the linear mechanism 450 and a movement distance from an original point to a stop position is controlled by the number of pulses input to the motor (stepping motor) mounted in the driving section 451 in the linear mechanism 450. That is, by moving the accessor mechanism 400 to its original point serving as its home position and by inputting the specified number of pulses into the above motor, the accessor mechanism 400 moves from its home position to each of the stop positions (positions "XP1" to "XP4", or a like).

In some cases, when the stepping motor is used as a source for driving, a motor is out of step, thus causing no positioning of the accessor mechanism 400 in a desired position. Therefore, in the embodiment, in order to avoid such a failure, control is exercised so that an actual position of the accessor mechanism 400 is detected by the X position sensor 418a (see FIG. 10) in synchronization with the movement of the accessor mechanism 400 and whether or not the accessor mechanism 400 is correctly moved is checked.

In the example of operations of the library device having configurations as above, an operation of taking out a given data cartridge 100 housed in each of the cells 300 in the magazines 200 (see FIG. 1) and of transferring the data cartridge 100 (in the embodiment, a data cartridge 100 being housed in a cell 300 of a column in the "third cell" shown in FIG. 14 is used as an example) to the drive device 600 is described.

When the predetermined number of pulses is input to the motor in the driving section 451 shown in FIG. 3 based on a distance from its original position (see FIG. 14) to the position "XP3", the accessor mechanism 400 (lifter mechanism 410) moves to the X direction shown in FIG. 14 by actions of the linear mechanism 450. At this time point, the flags 71c and 71b are detected, in synchronization with the movement of the accessor mechanism 400, by using the X position sensor 418a (see FIG. 10) which simultaneously moves together with the accessor mechanism 400 as a whole.

Next, with the accessor mechanism 400 being stopped in the position "XP3", by driving the driving section 411 of the lifter mechanism 410, the elevator 419 is lifted up to a specified height to place the picker mechanism 500 (see FIG. 7) at almost same height as the desired cell 100. Next, by driving the swivel driving motor 550 (see FIG. 9), the picker mechanism 500 is made to rotate around the rotation axis 540 (see FIG. 8) and makes the picker arm 521 (see FIG. 7) be directed toward the desired cell 100. Then, by driving the picker driving motor 530 to insert the picker arm 521 into a clearance formed in ribs (not shown) in the magazine 200, the driving section 451 of the linear mechanism 450 is made to be rotated to move the picker arm 521 toward the data cartridge 100 and to insert the picker arm 521 into the notch 110 of the data cartridge 100. Next, by driving the picker driving motor 530 in a reverse direction, the data cartridge 100 is drawn by the picker arm 521 and the data cartridge 100 is held by the picker mechanism 500 in a specified posture. Then, by again rotating the swivel driving motor 550, the picker mechanism 500 is made to be rotated to direct the picker arm 521 and the data cartridge 100 toward the drive device 600. Next, by rotating the motor of the driving section 451, the accessor mechanism 400 moves toward the drive device 600. By performing such series of operations as above, the data cartridge 100 housed in each of the cells 300 is taken out (extracted) and transferred to the drive device 600.

Figure 15:
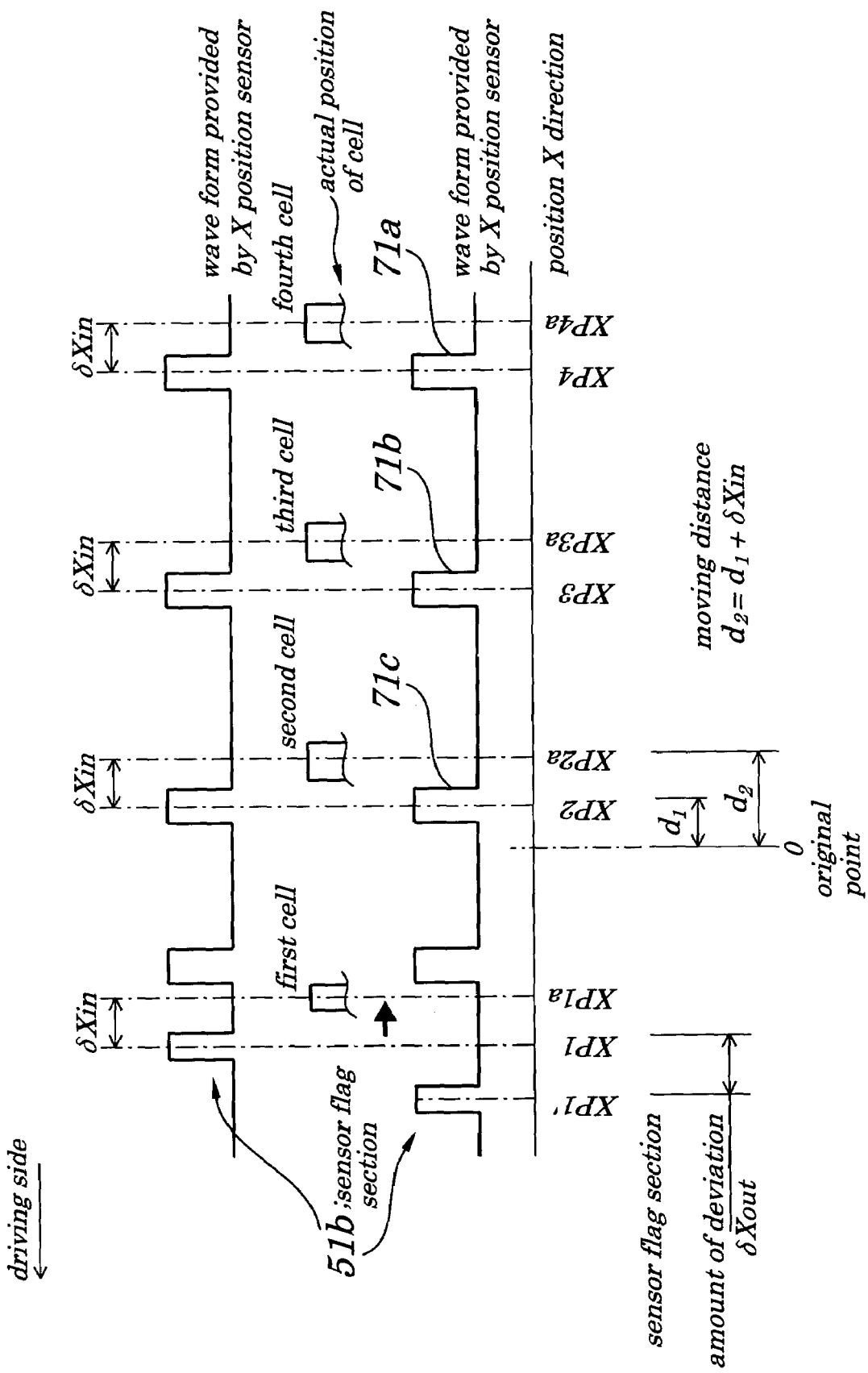
FIG. 15 is a diagram explaining operations of detecting an amount of deviation of magazines being set in a deviated position and of correcting a moving distance to each cell.

Next, operations of detecting an amount of positional deviation of each of the magazines 200 being set in a deviated position and of correcting a moving distance to each of the cells 300 are described by referring to FIG. 15. FIG. 15 shows a waveform (theoretical value) provided by the X position sensor 418a when the magazines 200 are set to an appropriate position, a waveform provided by the X position sensor 418a when the magazines 200 are set in a deviated position and a real position of each of the cells 300 occurring when the magazine 200 is set in the deviated position.

In FIG. 15, as shown by the sensor waveform provided when the magazines 200 are set in a deviated position, a position of the sensor flag section 51b (see FIG. 13) of the pendulum mechanism 50 is displaced by an amount "δ Xout" of positional deviation to become the position "XP1'" relative to the position "XP1" being an appropriate position. A position of each of the flags 71a to 71c being arranged in a fixed manner is in the same position as that given as a theoretical value.

Thus, when the sensor flag section 51b is displaced by the amount "δ Xout" of positional deviation, a real position of each of the cells 300 (first cell to fourth cell) in the magazines 200, as shown in FIG. 13, is displaced toward a side being opposite to the driving side shown in FIG. 15 relative to the appropriate positions "XP1" to "XP4" and to become each of positions "XP1a" to "XP4a".

As described above, since the accessor mechanism 400 (see FIG. 10) is driven to move by a predetermined moving distance by using an original point as a reference, in the case where a real position of each of the cells 300 is deviated from an appropriate position as shown in FIG. 15, even if the accessor mechanism 400 is moved by the predetermined moving distance, a positional deviation occurs between positions of the accessor mechanism 400 and of each of the cells 300. To solve this problem of the positional deviation and to position the accessor mechanism 400 accurately to a position of each of the cells 300, in the library device of the present invention, correction to the moving distance is made. That is, since a position of each of the cells 300 (first cell to fourth cell) is displaced by an amount "δ Xin" of positional deviation from an appropriate position in the state shown in FIG. 15, the amount "δ Xin" of positional deviation is added to the predetermined moving distance to make correction and to newly set an appropriate moving distance. For example, if the predetermined moving distance to the position "XP2" is "d1", by adding an amount "δ Xin" of positional deviation to the moving distance "d1", an appropriate moving distance "d2" can be set. Moreover, calculation of the amount "δ Xin" of positional deviation in the magazine 200 using an amount "δ Xout" of positional deviation in the sensor flag section is the same as described by referring to FIG. 13.

As described above, in the library device of the embodiment, since the flags 71a to 71c and the sensor flag section 51b used to detect a position of each of the cells 300 of the magazines 200 (see FIG. 1), which are mounted conventionally on the magazines 200, are mounted on the library device itself, the magazine 200 can be made smaller compared with the case of the magazine having the conventional configurations, thus achieving miniaturization of the library device itself. Additionally, the library device is so configured that presence or absence of the magazine 200 and a position of the set magazine 200 can be detected by using the pendulum mechanisms 50 and 60 and, therefore, by calculating the amount "δ Xin" of positional deviation based on the position of the detected magazine 200 to make correction to a moving distance of the accessor mechanism 400, it is made possible to accurately position the accessor mechanism 400 to a position of even each of the cells 300 in each of the magazines 200 having been set in a deviated position.

It is apparent that the present invention is not limited to the above embodiments but may be changed and modified without departing from the scope and spirit of the invention.

What is claimed is:

1. A library device comprising:
   a drive device to read and/or write data from or onto storage media housed in a desired data cartridge out of a plurality of data cartridges;
   at least one magazine including a plurality of cells arranged in one direction, each of which houses one of said plurality of said data cartridges;
   a carrying unit that mounts a picker mechanism to extract or load the desired data cartridge from or into a corresponding cell in said at least one magazine and moves in the one direction and that selectively positions said picker mechanism to a position of one of said plurality of cells; and
   a magazine position detecting unit to detect a position of each of said plurality of cells in said at least one magazine;
   wherein said magazine position detecting unit comprises a plurality of positioning flags arranged in line along the one direction, each of which is mounted in a manner to correspond to a position of each of said plurality of cells in said at said least one magazine, in a state that said at least one magazine is properly located;
   at least one magazine position detecting flag placed in the line along the one direction and being displaced when directly contacting said at least one magazine, and
   a common position sensor that moves together with said carrying unit as a whole and detects positions of said plurality of positioning flags and said at least one magazine position detecting flag.

2. The library device according to claim 1, wherein said at least one magazine position detecting flag are mounted on one end portion side of said at least one magazine set in said library device and serve, when said at least one magazine is properly located, as the positioning flag for the cell existing nearest to said one end portion, out of said plurality of cells in said at least one magazine.

3. The library device according to claim 1, wherein said magazine positioning detecting unit comprises a pendulum mechanism having at least one arm member being supported in a manner to be rotatable, in which said at least one arm member is provided with a directly-contacted portion directly contacting said at least one magazine and a sensor flag section serving as said at least one magazine position detecting flag.

4. The library device according to claim 1, wherein control is exercised to detect presence or absence of said at least one magazine according to a position of said at least one magazine position detecting flag detected by said common position sensor.

5. The library device according to claim 1, wherein control is exercised to detect a position of said at least one magazine sets in the library device in accordance with a position of said at least one magazine position detecting flag detected by said common position sensor.

6. The library device according to claim 1, wherein control is exercised to position said carrying unit to a position of each of said cells by presetting a distance from an original point of movement of said carrying unit to each of said positioning flags as a moving distance of said carrying unit and by moving said carrying unit from said original point to said moving distance.

7. The library device according to claim 6, wherein control is exercised to check a position of said carrying unit based on a result from detection to be performed on said positioning flag by operating said common position sensor in synchronization with movement of said carrying unit.

8. The library device according to claim 6, wherein control is exercised to correct the predetermined moving distance of said carrying unit, by detecting a position of said at least one magazine sets in the library device based on a position of said at least one magazine position detecting flag detected by said common position sensor and by calculating an amount of positional deviation of said at least one magazine from an appropriate position at which said at least one magazine is properly located, based on the detection and by using an amount of positional deviation of said at least one magazine.

9. A library device comprising:
  a drive device to read and/or write data from or onto storage media housed in a desired data cartridge out of a plurality of data cartridges;
  at least one magazine including a plurality of cells arranged in one direction, each of which houses one of said plurality of said data cartridges;
  a carrying means that mounts a picker mechanism to extract or load the desired data cartridge from or into a corresponding cell in said at least one magazine and moves in the one direction and that selectively positions said picker mechanism to a position of one of said plurality of cells; and
  a magazine position detecting means to detect a position of each of said plurality of cells in said at least one magazine;
  wherein said magazine position detecting means comprises a plurality of positioning flags arranged in a same straight line along the one direction, each of which is mounted in a manner to correspond to a position of each of said plurality of cells in said at said least one magazine, in a state that said at least one magazine is properly located;
  at least one magazine position detecting flag placed in the same straight line along the one direction and being displaced when directly contacting said at least one magazine, and
  a common position sensor that moves together with said carrying means as a whole and detects positions of said plurality of positioning flags and said at least one magazine position detecting flag.

10. The library device according to claim 9, wherein said at least one magazine position detecting flag are mounted on one end portion side of said at least one magazine set in said library device and serve, when said at least one magazine is properly located, as the positioning flag for the cell existing nearest to said one end portion, out of said plurality of cells in said at least one magazine.

11. The library device according to claim 9, wherein said magazine positioning detecting means comprises a pendulum mechanism having at least one arm member being supported in a manner to be rotatable, in which said at least one arm member is provided with a directly-contacted portion directly contacting said at least one magazine and a sensor flag section serving as said at least one magazine position detecting flag.

12. The library device according to claim 9, wherein control is exercised to detect presence or absence of said at least one magazine according to a position of said at least one magazine position detecting flag detected by said common position sensor.

13. The library device according to claim 9, wherein control is exercised to detect a position of said at least one magazine sets in the library device in accordance with a position of said at least one magazine position detecting flag detected by said common position sensor.

14. The library device according to claim 9, wherein control is exercised to position said carrying means to a position of each of said cells by presetting a distance from an original point of movement of said carrying means to each of said positioning flags as a moving distance of said carrying means and by moving said carrying means from said original point to said moving distance.

15. The library device according to claim 14, wherein control is exercised to check a position of said carrying means based on a result from detection to be performed on said positioning flag by operating said common position sensor in synchronization with movement of said carrying means.

16. The library device according to claim 15, wherein control is exercised to correct the predetermined moving distance of said carrying means, by detecting a position of said at least one magazine sets in the library device based on a position of said at least one magazine position detecting flag detected by said common position sensor and by calculating an amount of positional deviation of said at least one magazine from an appropriate position at which said at least one magazine is properly located, based on the detection and by using an amount of positional deviation of said at least one magazine.

* * * * *